United States Patent [19]

Sweany

[11] 3,815,129

[45] June 4, 1974

[54] PIEZOELECTRIC TRANSDUCER AND NOISE MAKING DEVICE UTILIZING SAME

[75] Inventor: Louis P. Sweany, Carmel, Ind.

[73] Assignee: P. R. Mallory & Co. Inc., Indianapolis, Ind.

[22] Filed: Dec. 12, 1972

[21] Appl. No.: 314,469

Related U.S. Application Data

[63] Continuation-in-part of Ser. No. 65,622, Aug. 20, 1970, abandoned.

[52] U.S. Cl. .................................. 340/388, 340/156

[51] Int. Cl. .......................... H03b 5/00, G08b 3/00

[58] Field of Search .................... 340/388 R, 156 R; 333/72 R; 331/116 R

[56] References Cited

UNITED STATES PATENTS

| | | | |
|---|---|---|---|
| 2,983,903 | 5/1961 | Philipps | 340/156 R |
| 3,345,588 | 10/1967 | Chesney | 333/72 R |
| 3,421,109 | 1/1969 | Wiggins | 331/116 R |
| 3,440,648 | 4/1969 | Camenzino | 340/388 R |

*Primary Examiner*—Harold I. Pitts

*Attorney, Agent, or Firm*—Richard H. Childress; Charles W. Hoffmann; Robert F. Meyer

[57] ABSTRACT

A noise making device, using a piezoelectric transducer, includes a piezoelectric element mechanically coupled to a substrate and an electrical circuit for energizing the transducer. The piezoelectric element includes a piezoelectric crystal, first and second electrode means carried by the crystal, and means dividing one of the electrode means into electrically isolated areas so as to provide a third electrode means.

12 Claims, 5 Drawing Figures

PATENTED JUN 4 1974

SHEET 1 OF 2

3,815,129

INVENTOR.
LOUIS P. SWEANY
BY Robert M. Meyer
ATTORNEY

PIEZOELECTRIC TRANSDUCER AND NOISE MAKING DEVICE UTILIZING SAME

This is a continuation-in-part of application Ser. No. 65,622, filed Aug. 20, 1970 now abandoned.

This invention relates to piezoelectric transducers and more particularly, to a noise making device using the piezoelectric transducer which can operate at unusually low voltages.

The problem of producing audible signals suitable for alarms and indications from small electric currents has been solved to a certain extent. In general, a problem is that transducing elements require a low impedance and high driving power in the vacuum tube or transistors associated with it. The design of circuits is such as to force the transducing element to adhere to the wave shape fed to it, and there is a loss of power in heat because of the energy devoted to overcoming the transducer's characteristics. This problem has, for the most part, been solved by the use of a piezoelectric transducer which is incorporated in circuitry in such a way so as to permit the natural rate of vibration of the unit as a whole to reflect back into the semiconductor oscillator circuit associated with it. While this approach has been, for the most part successful, there are still problems in those areas of application which operate at low voltages, for example, at from one volt to one and a half volts. Such applications would, for example, include battery operated alarm clocks and cameras where, in addition, there is the important consideration of size and cost.

More specifically, when silicon semiconductor devices are used in conventional circuits where a two terminal transducer provides the feedback to sustain electrical oscillations and mechanical vibrations, the connections are such that a transistor base-emitter voltage drop appears in series with the transducer. With silicon transistors and a 1.0 volt circuit supply, the useful drive voltage to the transducer is limited to about 0.3V. This arrangement may be satisfactory where the piezoelectric element is required to perform only a frequency controlling function, but it is inadequate where the element is required to do work, i.e. produce energy in the form of sound.

Silicon transistors are readily available that have a collector-emitter saturation voltage of about 0.3V. It would therefore be advantageous to connect the piezoelectric transducer from collector to emitter of a transistor to obtain about 0.7 volts drive from a 1.0 volt circuit supply and find another means to provide the required feedback voltage to sustain electrical oscillations and mechanical vibrations of the transducer. In accordance with the present invention, such means is provided by a transducer having a three electrode configuration.

The present invention is, therefore, concerned with providing a noise making device and has as one of its objects the provision of a noise making device operable at low voltages.

Another object of the invention is to provide a noise making device having a minimum number of parts and thus small in size and low in cost.

Another object of the invention is the provision of a noise making device using silicon transistors as amplifier means connected collector to emitter to a piezoelectric transducer and having means to provide sufficient feedback voltage to sustain electrical oscillations and mechanical vibrations of the transducers.

Another object of the invention is to provide a noise making device utilizing a piezoelectric transducer having a drive means and a feedback means wherein the drive means includes two electrodes and the feedback means includes a third electrode.

Still another object of the invention is to provide a noise making device utilizing a three electrode piezoelectric transducer and having an electrical circuit which includes amplifier means including two transistors connected as a common emitter amplifier to two of the electrodes, with a feedback circuit connected to the third electrode.

A still further object of the invention is to provide a noise making device utilizing a piezoelectric transducer and having an electrical circuit which includes an amplifier of a single transistor and wherein the piezoelectric transducer includes three electrodes, two of the electrodes connected collector to emitter of the transistor with a feedback circuit connected to the third electrode.

Another object of the invention is to provide a noise making device using a piezoelectric transducer having three electrodes wherein a drive electrode has a large area and a feedback electrode has a small an area as possible while still providing sufficient feedback voltage.

Yet still another object of the invention is the provision of a three electrode piezoelectric transducer wherein two of the electrodes constitutes substantially flat discs disposed on opposed sides of a piezoelectric crystal, and the third electrode is a relatively narrow island extending from an area near the center of one of the discs to its outer periphery.

These and other objects of the invention will be apparent from the following description taken in conjunction with the accompanying drawings wherein.

Generally speaking, the objects of the invention are accomplished by providing a piezoelectric transducer and an electrical circuit for energizing the piezoelectric transducer, the electrical circuit including amplifier means coupled to the piezoelectric transducer and a feedback loop feeding current from the transducer back to the amplifier means, the piezoelectric transducer providing AC current in the feedback loop while blocking DC current in the feedback loop. The piezoelectric transducer includes a piezoelectric element mechanically coupled to a substrate, the piezoelectric element including a piezoelectric crystal, first and second electrode means carried by the crystal, and means dividing said first electrode means into electrically isolated areas so as to provide a third means, the first electrode means having a much larger area that the third electrode means; and electrical terminals electrically connected to each of the electrode means.

As a particular embodiment of the three electrode piezoelectric transducer, two of the electrodes constitute substantially flat sheets disposed on opposed sides of a piezoelectric crystal, and the third electrode is a relatively narrow island extending from an area near the center of one of the sheets to its outer periphery.

In particular, when the three electrode piezoelectric transducer is used in a noise making device, the amplifier means is connected between two electrodes at least one of which is much larger than the third electrode, the first two electrodes accepting the drive voltage from the amplifier, the third electrode serving as a connection to a feedback voltage such that the large electrode provides the greatest bending action of the transducer, with the third electrode being as small as possible while still providing sufficient feedback voltage.

Figure 1:
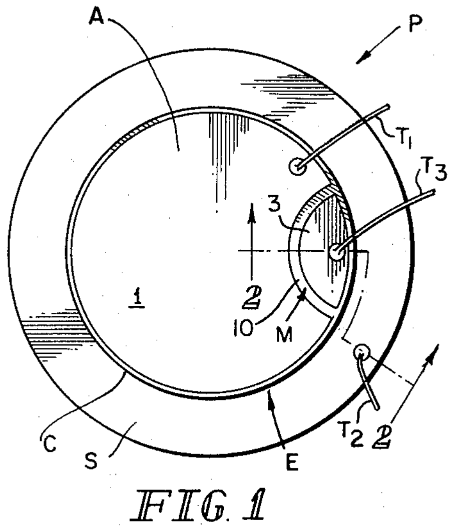
FIG. 1 is a top view of a piezoelectric transducer fabricated in accordance with one embodiment of the invention.
Figure 2:
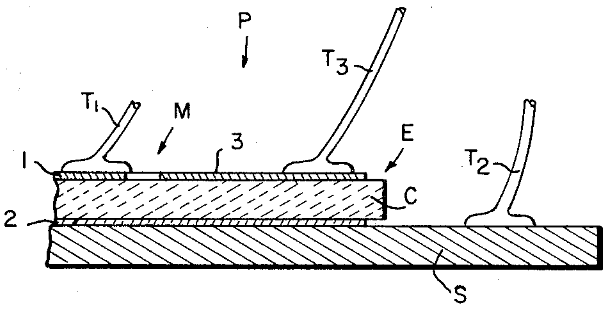
FIG. 2 is an enlarged cross section taken along the lines 2—2 of FIG. 1.

Referring now to the drawings, and more particularly, to FIGS. 1 and 2, there is shown a piezoelectric transducer P. Piezoelectric transducer P includes a piezoelectric element E suitably bonded to a substrate S, and electrical terminals $T_1$, $T_2$ and $T_3$. Piezoelectric element E includes a piezoelectric crystal C in the shape of a disc, first and second electrode means 1 and 2, and means M dividing one of the electrode means (electrode means 1) into an electrically isolated area or island 12 so as to provide a third electrode means 3. Means M includes a narrow vacant portion 10 forming a slit in electrode means 1. Piezoelectric element E is bonded (not shown) to substrate S through a suitable electrically conductive agent, such as an epoxy bonding agent. Electrode means 1 and 2 include a thin sheet or coating of electrically conductive material, such as silver, applied to opposed sides of crystal C. Since electrode means 3 is fabricated from electrode means 1, it too includes a thin sheet or coating of electrically conductive material. A suitable material for piezoelectric crystal C would include a lead, zirconium, titanium composite, for example. Substrate S which serves as a diaphragm of the transducer may be fabricated from a metal such as brass. As shown, island 12 is substantially smaller in area than the remaining area A of the sheet of electrode 1.

Electrode means 1 and 2 provide the drive means for the piezoelectric transducer, while electrode means 3, which is much smaller in area than electrode means 1 and 2, provides a feedback means from the transducer. Electrode means 1, 2 and 3 are electrically connected to terminals $T_1$, $T_2$ and $T_3$ respectively. The piezoelectric transducer of the present invention with its isolated electrode areas provides AC current in a feedback loop of an electrical circuit while blocking DC current to the feedback loop. The use of the third electrically isolated electrode permits the use of the collector to emitter saturation characteristics of the silicon transistor so as to drive the transducer at higher voltages than normally obtained in conventional feedback circuits.

In the manufacturing of the piezoelectric element E a poling voltage is applied normal to the electrode surfaces, which is the same polarity over the entire surface of the element. The piezoelectric element operates in an expansioncontraction mode when electrically energized. Thus, when bonded to substrate S, the composite transducer bends when energized electrically. The thickness and diameters of element E and substrate S are selected to obtain a natural mechanical vibrational frequency in the mid-audio range.

When a plus (+) voltage is applied to terminal $T_2$ ($T_1$ minus (−)) it causes the element E to bend and a minus (−) voltage is generated at $T_3$. Reversing the polarity of $T_2$ and $T_1$ reverses the polarity of $T_3$ so that a feedback voltage of either polarity can be obtained.

To maximize the useful audible sound output, it is desirable that the electrode associated with terminal $T_1$ have a large area to obtain the greatest bending action of the transducer. The electrode associated with terminal $T_3$ should therefore be as small as possible while still providing the required feedback voltage at a reasonable source impedance. In practice, when a transducer is driven at amplitudes that will produce useful sound output, spurious mechanical resonances (or vibrations) can occur near the edges of the transducer. These spurious vibrations can alter the phase of the feedback voltage and can cause an oscillation failure in the circuit. The effects of spurious vibrations at the element edges are minimized by the electrode configuration shown in FIG. 5.

Figure 5:
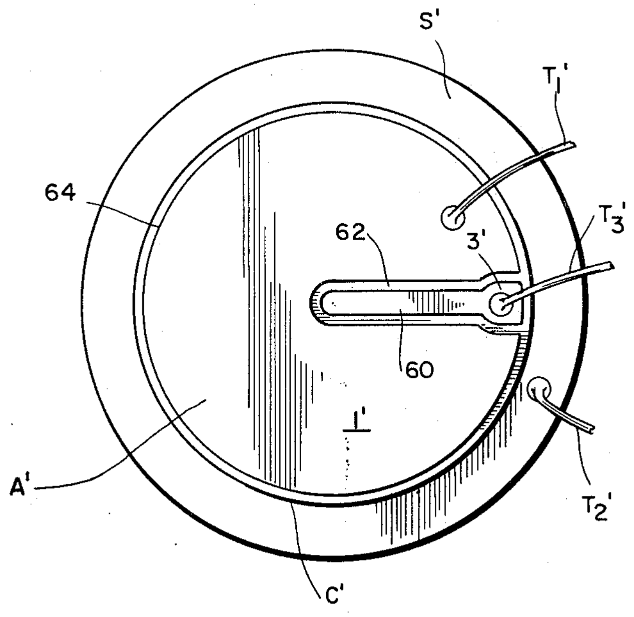
FIG. 5 is a top view of another embodiment of the transducer.

Referring to FIG. 5, there is shown a piezoelectric element E which includes a piezoelectric crystal C′ carried on a substrate S′ through an electrode (not shown) in the manner shown in FIG. 2, and electrodes 1′ and 3′ each electrically connected to electrical terminals $T_1'$, $T_2'$ and $T_3'$. Electrode 1′ and the electrode disposed between the crystal and substrate are sheets or thin coatings of silver. Electrode 3′ comprises an island 60 formed in electrode 1′ through slits 62. As shown the island is substantially rectangular and extends from an area near the center of electrode 1′ to its periphery 64 and is substantially smaller in area than the remaining area A′ of the sheet of electrode 1′.

Figure 3:
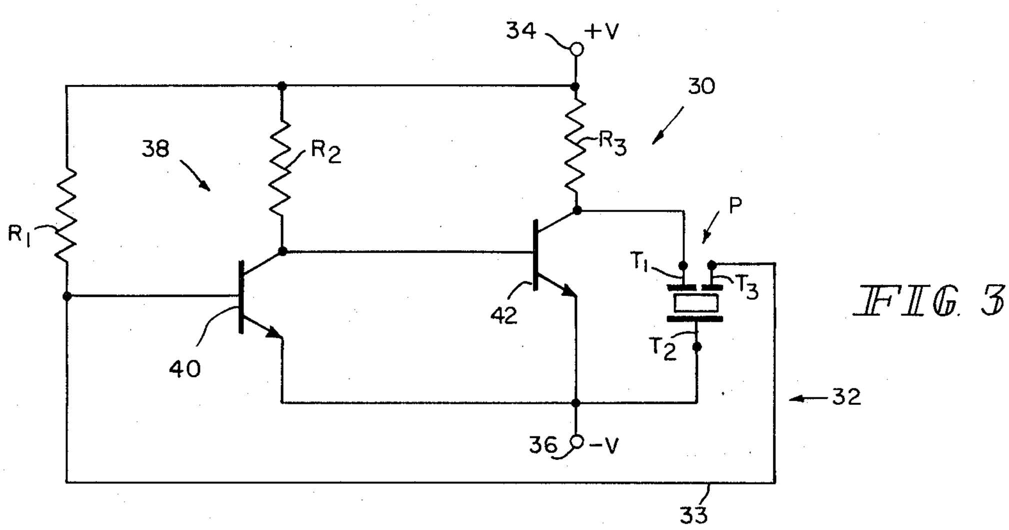
FIG. 3 is a wiring diagram schematically illustrating the noise making device of the invention.

Referring now to FIG. 3, the use of the piezoelectric transducer is shown being utilized in a noise making device with very few component parts. Noise making device 30 includes the piezoelectric transducer P and an electrical circuit 32 for energizing the piezoelectric transducer. Electrical circuit 32 includes terminals 34 and 36 adapted to be connected to a suitable direct current power supply, amplifier means 38, and feedback loop 33. Amplifier means 38 includes transistors 40 and 42 with their cooperating biasing resistors $R_1$, $R_2$ and $R_3$. As shown, transistors 40 and 42 are electrically connected to provide a common-emitter amplifier means. Transistor 42 is connected to electrode means 1 and 2 or the drive means of the transducer, through terminals $T_1$ and $T_2$ from collector to emitter with the collector of transistor 40 connected to the base of transistor 42 and the emitter of transistor 40 connected to the emitter of transistor 42. Electrode means 3 of the feedback means of the transducer of the piezoelectric transducer is connected to the base of transistor 40 through terminal $T_3$ and feedback loop 33. Resistors $R_1$, $R_2$ and $R_3$ serves as biasing resistors for the transistors. $R_3$ serves as a collector biasing resistor for transistor 42, $R_1$ serves as a base biasing resistor for transistor 40, while $R_2$ serves as a collector biasing resistor for transistor 40 and also as a base biasing resistor for transistor 42. By selecting the proper polarity at terminals $T_1$ and $T_2$ of the piezoelectric transducer for connection to the collector and emitter of transistor 42, the feedback voltage is caused to be in phase with the driving voltage and oscillations are started and maintained at the resonant frequency of the piezoelectric transducer.

Figure 4:
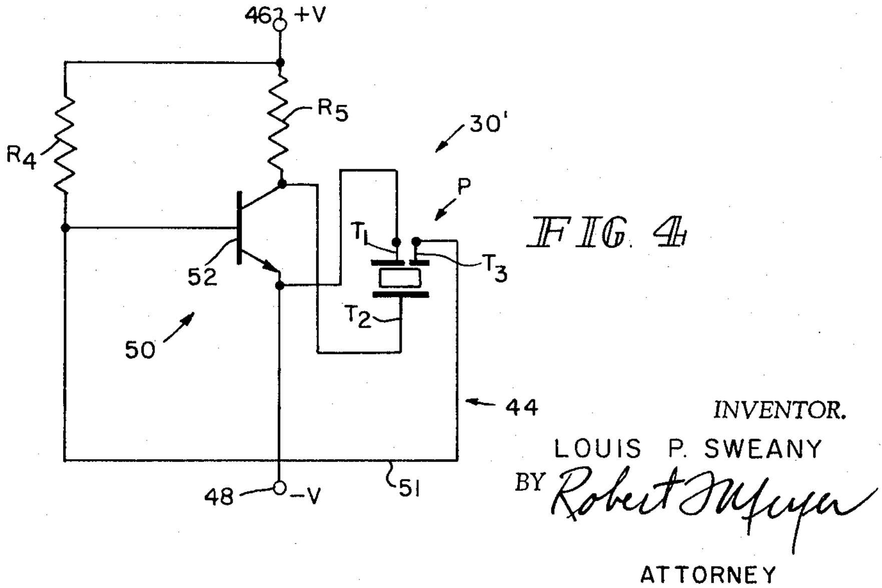
FIG. 4 is a wiring diagram of another embodiment of the noise making device.

Referring now to FIG. 4 there is shown another embodiment of the noise making device. In this embodiment, the size and cost of the electrical circuit is further reduced by the use of only a single transistor for the amplifying means. Noise making device 30' includes piezoelectric transducer P and electrical circuit 44. Electrical circuit 44 includes terminals 46 and 48 adapted to be connected to a suitable direct current power supply, amplifier means 50 and feedback loop 51. Amplifier means 50 includes transistor 52 which is connected to terminals $T_1$ and $T_2$ through the collector and emitter of the transistor, the base being connected to terminal $T_3$. Resistor $R_4$ biases the base of the transistor while resistor $R_5$ biases the collector of the transistor. Since the single transistor circuit provides a single 180° phase reversal, the drive terminals $T_1$ and $T_2$ need to be reversed from that of FIG. 3 to obtain the required 360° phase shift from the feedback terminal $T_3$.

In both of the circuits of FIGS. 3 and 4, the transducer operates in essentially its series resonant mode, where electrical energy is delivered to the transducer at low voltages to produce useful sound energy output, series resonance being defined as that frequency where the voltage generated by the transducer is 180° out of phase with the applied voltage.

Thus there is described a piezoelectric transducer having an improved three electrode construction and electrical energizing circuits which provides a noise making device having very few component parts and thus occupies a minimum of space at low cost.

What is claimed is:

1. A transducer comprising:

a. a diaphragm b. a piezoelectric element mechanically connected to said diaphragm comprising a disc shaped piezoelectric crystal, first and second sheets of electrically conductive material disposed on opposite sides of said disc shaped crystal, means dividing said first sheet into an electrically isolated island of said electrically conductive material, said island being of substantially smaller area than the remaining area of said first sheet, and c. electrical terminals electrically connected to said island, said remaining area, and said second sheet.

2. A transducer according to claim 1 wherein said island is substantially rectangular and extends from an area near the center of said first sheet to its outer periphery.

3. A piezoelectric transducer according to claim 1 wherein said diaphragm includes a metallic substrate to which said piezoelectric element is bonded.

4. A piezoelectric transducer according to claim 1 wherein said metallic substrate is brass.

5. A piezoelectric transducer according to claim 1 wherein said means dividing one of said electrode means includes a slit cut in said first sheet of electrically conductive material.

6. A piezoelectric transducer according to claim 1 wherein said electrically conductive material is silver.

7. A piezoelectric transducer according to claim 1 wherein said piezoelectric crystal is a lead, zirconium, titanium composite.

8. A noise making device comprising:

a. a piezoelectric transducer including a diaphragm; a piezoelectric element mechanically connected to said diaphragm including a disc shaped piezoelectric crystal, first and second sheets of electrically conductive material disposed on opposite sides of said disc shaped crystal, means dividing said first sheet into an electrically isolated island of said electrically conductive material, said island being of substantially smaller area than the remaining area of said first sheet; and electrical terminals electrically connected to said island, said remaining area of said first sheet and said second sheet, b. a transistor amplifier circuit connected to said piezoelectric transducer collector-emitter to said second sheet and said remaining area, and a feedback circuit connected base to said island.

9. A noise making device according to claim 8 wherein said island is substantially rectangular and extends from an area near the center of said first sheet to its outer periphery.

10. In a noise making device according to claim 8 wherein said amplifier means includes first and second transistors electrically coupled to provide a common-emitter amplifier means.

11. In a noise making device according to claim 10 wherein said first transistor is connected to said second sheet and said remaining area from collector and emitter respectively, the collector of said second transistor connected to the base of said first transistor, the emitter of said second transistor connected to the emitter of said first transistor, and said island is connected to the base of said second transistor.

12. In a noise making device according to claim 8 wherein said amplifier means includes a single transistor connected to said second sheet and said remaining area from collector and emitter respectively and said island is connected to the base of said transistor.

* * * * *

UNITED STATES PATENT OFFICE

CERTIFICATE OF CORRECTION

Patent No. 3,815,129 Dated June 4, 1974

Inventor(s) Louis P. Sweany

It is certified that error appears in the above-identified patent and that said Letters Patent are hereby corrected as shown below:

Col. 2, line 64, insert ---electrode--- after "third".

Col. 3, line 63, insert a hyphen after "expansion".

Signed and sealed this 3rd day of December 1974.

(SEAL)
Attest:

McCOY M. GIBSON JR.
Attesting Officer

C. MARSHALL DANN
Commissioner of Patents